United States Patent [19]

Hsu

[11] Patent Number: 5,255,812
[45] Date of Patent: Oct. 26, 1993

[54] CONTAINER CAP

[76] Inventor: Yu T. Hsu, No. 221, Ming Der Rd., Ming Der Tsuen, Tour Woei Shiang, Miau Lih Hsien, Taiwan

[21] Appl. No.: 907,695

[22] Filed: Jul. 1, 1992

[51] Int. Cl.$^5$ ............... B65D 17/42; B65D 43/06; B65D 25/08; F24J 1/00
[52] U.S. Cl. ................ 220/277; 220/212; 220/262; 220/355; 220/521; 215/227; 215/228; 206/222; 126/263
[58] Field of Search ......... 220/212, 262, 267, 277, 220/278, 355, 356, 521, 735; 215/227, 228; 206/219, 222; 126/263

[56] References Cited

U.S. PATENT DOCUMENTS

| | | | |
|---|---|---|---|
| 2,265,172 | 12/1941 | Katz | 126/263 X |
| 2,300,793 | 11/1942 | Martin | 126/263 |
| 2,615,443 | 10/1952 | Sukacev | 206/219 X |
| 3,561,424 | 2/1971 | Failla | 126/263 |
| 3,653,372 | 4/1972 | Douglas | 126/263 |
| 3,970,068 | 7/1976 | Sato | 126/263 |
| 4,328,218 | 7/1985 | Maione | 126/263 X |
| 4,640,264 | 2/1987 | Yamaguchi et al. | 126/263 |
| 4,741,324 | 5/1988 | Ina et al. | 126/263 |
| 4,770,305 | 9/1988 | Su | 220/278 X |
| 4,785,931 | 11/1988 | Weir et al. | 206/222 |
| 4,856,651 | 8/1989 | Francis, Jr. | 206/219 |
| 4,989,729 | 2/1991 | Huang | 206/222 |
| 5,082,136 | 1/1992 | Schumann | 220/278 |

Primary Examiner—Allan N. Shoap
Assistant Examiner—Vanessa Caretto
Attorney, Agent, or Firm—Pro-Techtor International

[57] ABSTRACT

A container cap for vise with a self-heating tin container having a chemical compound on one end for releasing heat upon mixing with a liquid catalyzer. The container cap has an annular groove on the bottom around the border into which a peripheral flange on a self-heating tin container is inserted for positioning, a pointed member on the inside surface of the elastic top edge thereof, a film covering covered over the pointed member to hold a liquid catalyzer. Pressing the elastic top edge of the container cap against the tin container to which the container cap is fastened causes the pointed member to pierce the film covering permitting the liquid catalyzer to flow out of the container cap for mixing with the chemical compound in the tin container.

3 Claims, 5 Drawing Sheets

CONTAINER CAP

BACKGROUND OF THE INVENTION

The present invention relates to a container cap specifically designed for use with a self-heating container.

Various canned foods can be quickly prepared by heating, therefore they are widely accepted by the people who have little skill in cooking or do not have much time to cook foods. However, a cooking or heating device shall be required for heating a canned food. It is known that mixing lime with distilled water, glacial acetic acid and etc. will cause a chemical reaction in releasing heat. Therefore, various chemical compounds have been used for making self-heating tin containers for heating instant foods by means of a chemical reaction. When the chemical compound in a separate chamber inside a tin container is mixed with a liquid catalyzer, heat is released to warm up the foods for service.

SUMMARY OF THE INVENTION

The present invention has been accomplished under the aforesaid circumstances. It is therefore the main object of the present invention to provide a container cap for use with a self-heating tin container which has a pointed member on an elastic layer, which pointed member pierces a liquid catalyzer container inside the container cap when the elastic layer is pressed on, to let a liquid catalyzer flow out of the container cap for mixing with a chemical compound in releasing beat for heating the foods contained in the self-heating tin container.

DETAILED DESCRIPTION OF THE PREFERRED EMBODIMENT

Figure 1:
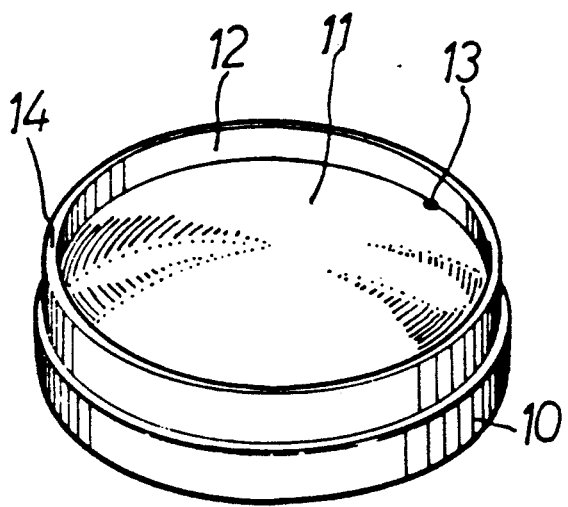
FIG. 1 is an elevational view of the preferred embodiment of the container cap of the present invention.

Referring to FIG. 1, therein illustrated is the preferred embodiment of the container cap of the present invention which is generally comprised of a ring-shaped base 10, an elastic layer 11 extending across the interior of the ring-shaped base 10, a plurality of vent holes 13 around the border between the elastic layer 11 and a peripheral flange 12 on the ring-shaped base 10. The elastic layer 11 has an outside surface curved outwards (See FIGS. 3 and 4). However, the topmost point on the outside surface of the elastic layer 11 is lower than the level of the topmost edge 14 of the peripheral flange 12 of the ring-shaped base 10.

Figure 2:
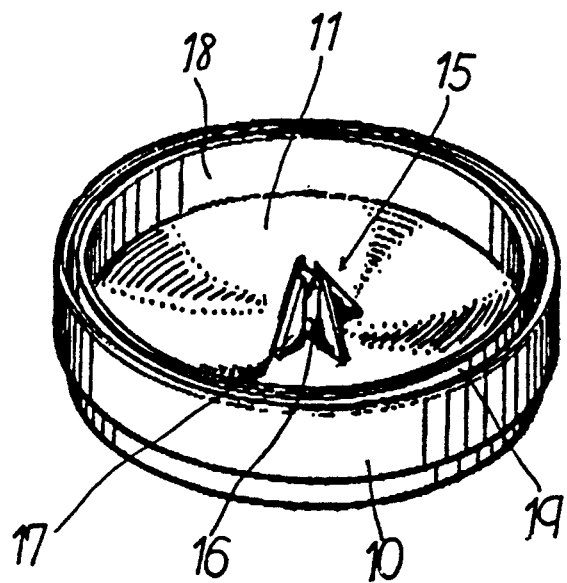
FIG. 2 is a back view of the container cap of FIG. 1.

Referring to FIG. 2, the elastic layer 11 comprises a pointed member 15 on the inside at the center, and a circular peripheral wall 18 raised from the inside surface thereof with an annular groove 19 defined between the ring-shaped base 10. The pointed member 15 may be variously shaped. In the present preferred embodiment, the pointed member 15 is comprised of a base 16 and four triangular plates 17. The triangular plates 17 are equiangularly raised from the peripheral edge of the base 16 having each a pointed angle projected over the topmost edge of the base 16 and disposed adjacent to one another.

Figure 3:
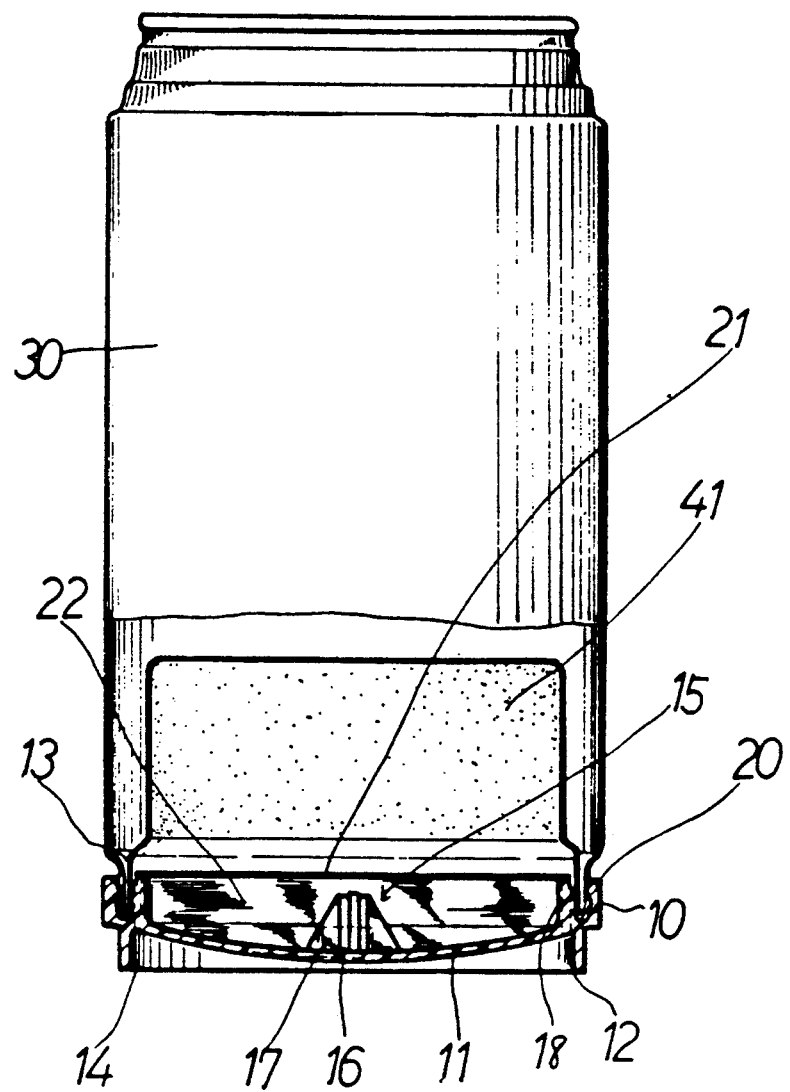
FIG. 3 is an installed example showing that the container cap has been fastened to a tin container on one end.

Referring to FIG. 3, the annular groove 19 has a uniform depth. Inside the annular groove 19, there is an inside flange 20 around the inside surface of the ring-shaped base 10. A film covering 21 is stretched across the peripheral wall 18 of space thus defining a water-tight space (the water-tight space being the area enclosed by the film covering 21, the peripheral wall 18, and the elastic layer 11) and filled with a liquid catalyzer (for example water) 22.

Figure 4:
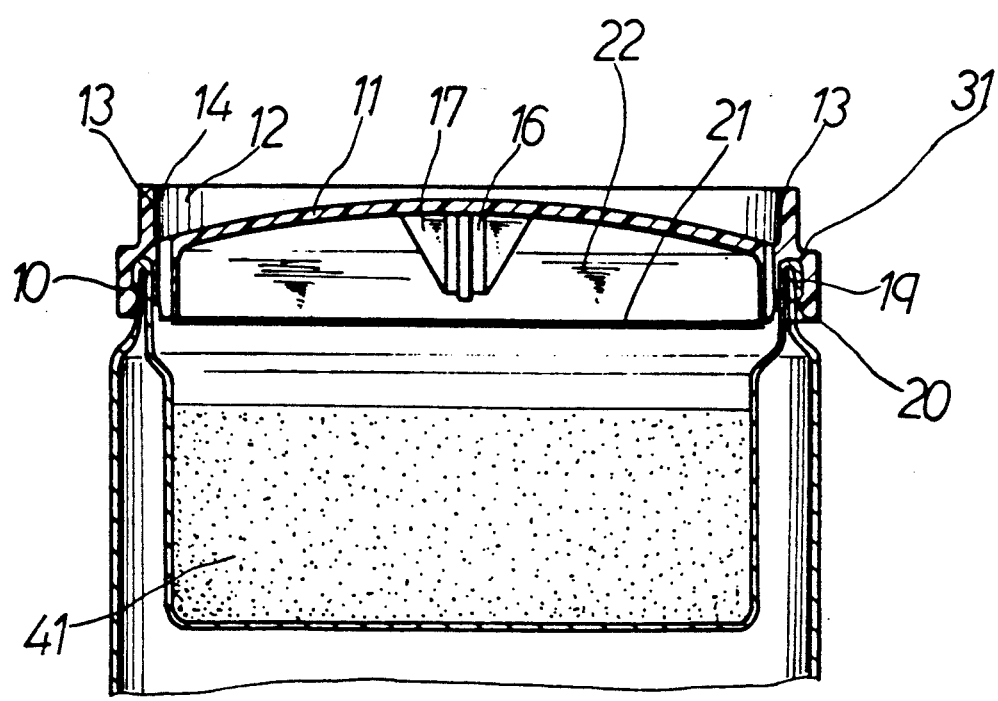
FIG. 4 is a partly enlarged view taken of FIG. 3.

Referring to FIG. 4 and seeing FIGS. 2 and 3 again, the container cap is fastened to a tin container 30 on the bottom. Inserting the peripheral flange 31 on the bottom end of the tin container 30 into the annular groove 19 causes the inside flange 20 of the ring-shaped base 10 to hook up with the peripheral flange 31 of the tin container 30, and therefore the container cap becomes firmly secured to the tin container.

Figure 5:
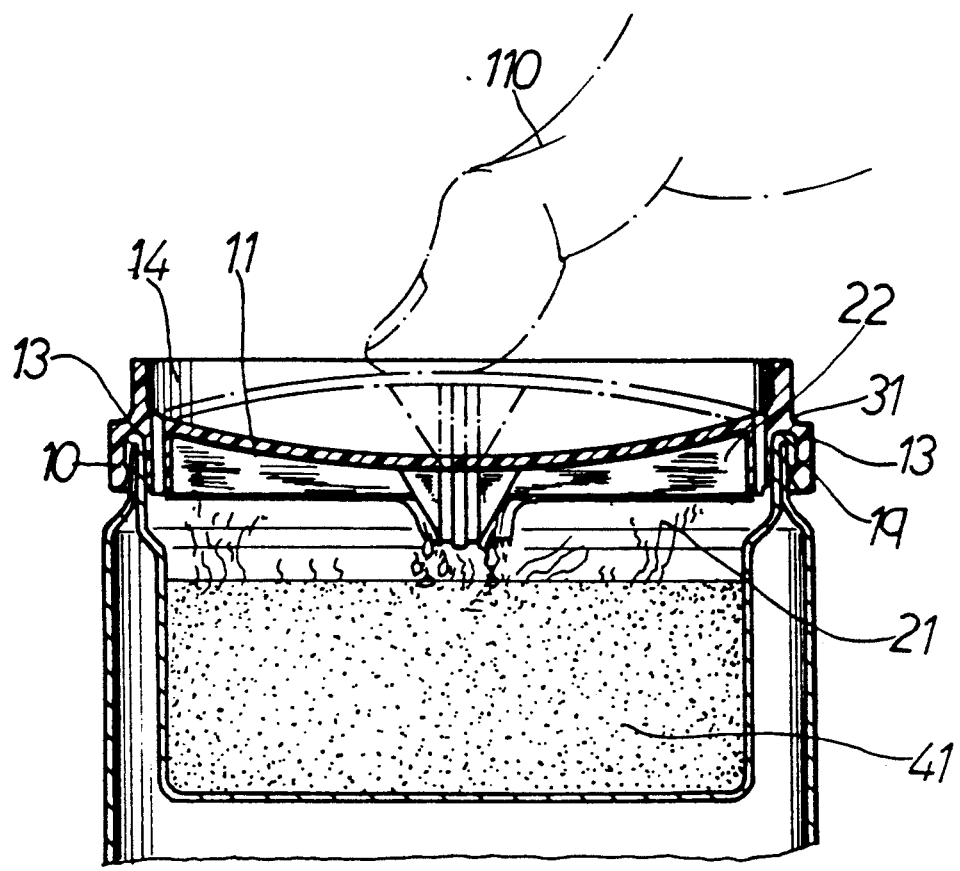
FIG. 5 illustrates that pressing the cap with a finger causes the pointed member to pierce the film covering.

Referring to FIG. 5, pressing the elastic layer 11 with the fingers causes the pointed member 15 to pierce the film covering 21, and therefore the liquid catalyzer 22 flows into a space on the bottom of the tin container 30 to mix with the chemical compound 41 contained therein thus producing a chemical reaction. During the process of the chemical reaction, heat is continuously released through the vent holes. After use, the container cap may be removed from the tin container 30 for sealing a regular container of the same size or for other purposes.

What is claimed is:

1. A container cap for use with a metal container having a peripheral lip comprising:
   a chemical compound contained in one end of the metal container; and
   a liquid catalyzer which is released into the chemical compound causing a reaction which releases heat; and wherein
   the cap comprising a ring-shaped base having an outer peripheral wall extending in a first direction, a peripheral flange extending in a second direction opposite said first direction, and an inner peripheral wall extending in said first direction and spaced from said outer peripheral wall to define a groove therebetween to facilitate attachment to the container lip, an elastic layer extending across the interior of said inner peripheral wall, a plurality of vent holes at the periphery of the elastic layer radially inwardly of said peripheral flange;
   the elastic layer having an inner surface facing in said first direction and an outer surface facing in said second direction, said elastic layer having a pointed member at the center of said inner surface and wherein
   a film covering is stretched across said inner peripheral wall to form a containment area for the liquid catalyzer; whereby
   pressure added to the elastic layer in said first direction causes the pointed member to rupture the film covering, permitting the liquid catalyzer to flow rapidly into the chemical compound contained in the metal container, initiating the chemical reaction which rapidly releases heat.

2. The container cap according to claim 1 wherein:
   said outer surface is curved outwardly in said second direction, the outermost point on the outer being lower than the level of the outermost edge of the peripheral flange of the ring-shaped base.

3. The container cap according to claim 1 wherein:
   the pointed member is comprised of four triangular plates, the triangular plates each having a pointed angle at its end distal from said elastic layer, and the plates being disposed adjacent to each other.

* * * * *